No. 716,864. Patented Dec. 30, 1902.
F. A. CASEY & A. E. CUTLER.
SAFETY VALVE.
(Application filed Dec. 23, 1901.)
(No Model.)
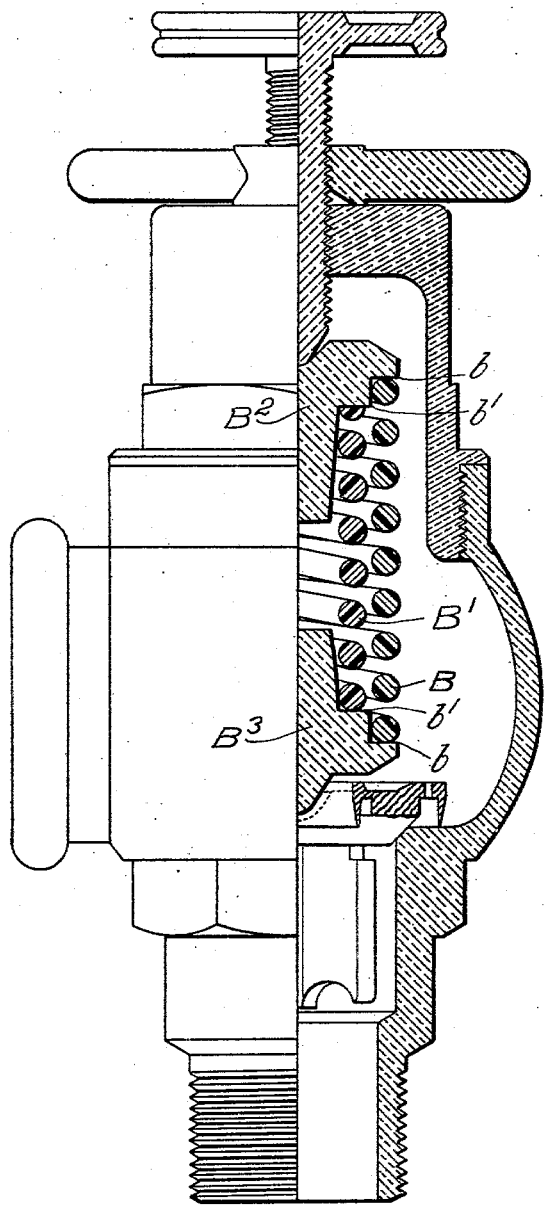
WITNESSES
G. A. Rockwell.
C. B. Maynadier.
INVENTORS
Frederick A. Casey, and
Arthur E. Cutler,
by J. E. Maynadier
Attorney

UNITED STATES PATENT OFFICE.

FREDERICK A. CASEY, OF BILLERICA, AND ARTHUR E. CUTLER, OF SOMERVILLE, MASSACHUSETTS, ASSIGNORS TO ASHTON VALVE COMPANY, OF HARTFORD, CONNECTICUT, A CORPORATION OF CONNECTICUT.

SAFETY-VALVE.

SPECIFICATION forming part of Letters Patent No. 716,864, dated December 30, 1902.

Application filed December 23, 1901. Serial No. 86,892. (No model.)

*To all whom it may concern:*

Be it known that we, FREDERICK A. CASEY, of Billerica, and ARTHUR E. CUTLER, of Somerville, in the county of Middlesex and State of Massachusetts, have invented an Improved Safety-Valve, of which the following is a specification, reference being had to the accompanying drawings, making a part hereof.

Safety-valves as heretofore made consist of a tube adapted to be connected to the boiler or other reservoir of fluid or liquid under pressure, which tube is closed by a valve held to its seat by a spring whose upper abutment is adjusted by a screw, and it has long been known that the spring must be of a quality adapted to the pressure for which the valve is set in order to insure the proper working of the valve, and it has also long been known that any given valve-spring will work best under a given load. By "load" of a valve-spring is of course meant the area of the valve in square inches which is exposed to pressure multiplied by the pressure per square inch of the confined steam or other fluid or liquid. This is so well recognized by manufacturers of safety-valves that it has long been their practice to mark each spring with the pressure in pounds per square inch for which that spring is best adapted, and when the user of a safety-valve desires to use it for a pressure ten pounds more or less than it was made for his first step is to procure a new spring adapted for the new pressure and substitute that new spring for the old one—that is, the range of adjustment of safety-valves as heretofore made is very limited, practically not exceeding ten pounds in either direction or twenty pounds range. For example, a safety-valve whose spring may be theoretically adjusted at the extreme for fifty pounds pressure per square inch may work best at a pressure of, say, fifteen pounds per square inch and may be adjusted for pressures varying from ten pounds to twenty pounds per square inch without materially impairing its working; but such a spring is necessarily so limber that it will serve fairly well for lower pressures than ten pounds and may be used practically for pressures up to thirty pounds, and this has long been well known to manufacturers of safety-valves, while a safety-valve with a shorter and stiff spring with a theoretical extreme adjustment for fifty pounds pressure per square inch will work best at a pressure of, say, thirty-five pounds per square inch and is much more limited in its range of adjustment, for while it will work well under pressures varying from thirty pounds to forty pounds per square inch it is practically unfit for pressures under twenty pounds or as high as fifty pounds per square inch, and this has long been well known. With higher pressures the range of adjustment is proportionally less, for a safety-valve whose spring is suitable for a pressure of one hundred pounds to the square inch and may be theoretically adjustable at the extreme for one hundred and fifty pounds pressure is practically unfit for use with pressures under ninety pounds or over one hundred and ten pounds per square inch, and if its spring be suitable for pressures of two hundred pounds per square inch with an extreme adjustment theoretically of two hundred and fifty pounds the practical range is less than from one hundred and ninety pounds to two hundred and ten pounds, as is well known.

The object of our invention is to greatly increase the range of adjustment of safety-valves, and we have discovered that we can practically change the adjustment from five pounds to the square inch to sixty pounds by the use of two springs, the longer limber spring being capable of an extreme but unpractical adjustment for pressures of about fifty pounds to the square inch and a shorter stiff spring being capable of the same extreme but unpractical adjustment, these two springs being of such relative length that the longer limber spring sustains the whole load up to pressures of about twenty-five pounds, both springs thereafter sustaining each a part of the load, a short stiff spring taking gradually more and more of the total load as the adjustment is varied for greater and greater pressures, and thereby relieving the long limber spring and being itself relieved by the longer limber spring, so that when our improved valves are adjusted for a pressure of about sixty pounds both springs still work admirably, neither being strained to the limit of its theoretical capacity, but each so well under that extreme strain that each still retains that quality of elasticity requisite for the proper working of the safety-valve.

The valve shown in the drawing is an inch-and-a-half valve of the kind called the "pop-valve," and its spring B is three and a quarter inches long of Jessop steel wire three-sixteenths of an inch in diameter, wound on an arbor one inch and one-eighth in diameter, and its spring B' is two and five-eighths inches long of No. 11 Jessop steel wire, Birmingham gage, wound on an arbor five-eighths of an inch in diameter. With these two springs these valves work admirably in practice at all pressures up to sixty pounds and will serve fairly well with pressures up to seventy pounds and are, in fact, used on steam heating apparatus for railway-trains, where the pressure is required to vary from five pounds up to sixty pounds, depending upon the length of train and the severity of the weather; but our invention is of course practically applicable for all pressures and all sizes, and our new principle is that the two springs must (for the best practical working with a very large range of adjustment) be one comparatively limber and the other comparatively stiff, so that as the adjustment is varied to increase the load the stiffer one shall take a greater and greater share of the load.

While it is not necessary in using valves for high pressures that the two springs shall vary in length, it is of course essential that the limber spring shall be longer than the stiff spring when the valve is to be adjusted for low pressures—say under thirty pounds—and this difference in length is desirable in all cases for the best results. It is necessary, however, that the springs should be normally of different lengths—that is, of different length when neither is compressed.

We are aware that nested springs have long been used with one abutment stationary; but we are the first to use two or more springs with one abutment ajustable and the other abutment movable under the force of the load, and for that use in safety-valves we have discovered that it is essential that one of the springs shall be practically stronger than the other, so that each turn of the adjustment-screw when both springs are active throws more and more of the total load on the stronger spring.

Practically it is necessary in all safety-valves for extreme range of adjustment that the distance apart of the abutments for the stiff spring shall be greater than the distance apart of the abutments for the limber spring, as will be clear from the drawing, and the best way of doing this is to form steps $b$ $b'$ on the abutments $B^2$ $B^3$, these steps also aiding to keep the springs B B' in place. Of course only one of the abutments need be stepped.

What we claim as our invention is—

1. The improved safety-valve above described comprising a valve proper; adjusting means; and between the valve and adjusting means springs of different strength and of normally different length.

2. In a safety-valve the stepped abutments in combination with springs differing in strength between the valve proper and the adjusting means, each spring having its own step.

FREDERICK A. CASEY.
ARTHUR E. CUTLER.

Witnesses:
G. A. ROCKWELL,
C. B. MAYNADIER.